United States Patent [19]
Moran

[11] 3,739,229
[45] June 12, 1973

[54] OVERCURRENT SENSING AND RESTRAINT CONTROL FOR SECTIONALIZING SWITCH

[75] Inventor: Richard J. Moran, Milwaukee, Wis.
[73] Assignee: McGraw-Edison Company, Elgin, Ill.
[22] Filed: Sept. 20, 1971
[21] Appl. No.: 182,079

[52] U.S. Cl. .................. 317/22, 317/28, 317/29, 317/36 TD, 317/49
[51] Int. Cl. ............................................. H02h 7/26
[58] Field of Search ................. 317/22, 25, 27, 28, 317/29, 36 TD, 49, 26

[56] References Cited
UNITED STATES PATENTS
3,571,661  3/1971  Schultz .................................. 317/22

Primary Examiner—J. D. Miller
Assistant Examiner—Harvey Fendelman
Attorney—Jon Carl Gealow

[57] ABSTRACT

A sectionalizing switch control having a ground fault current sensing circuit and a restraint circuit including voltage or current sensing means. The restraint circuit restrains operation of the switch control and restrains operation of the ground fault sensing circuit due to load current inrush when voltage or current initially becomes present at the sectionalizing switch. The sectionalizing switch control and the ground fault sensing circuit both obtain operating power from system voltage at the sectionalizing switch. When voltage or current is initially sensed at the sectionalizing switch by the sensing means, the restraint circuit modifies the ground fault sensing circuit so that it will not respond to inrush load current to produce an output indicative of fault current. The restraint circuit includes a timing circuit which maintains the change initiated by the sensing means for a predetermined length of time.

15 Claims, 1 Drawing Figure

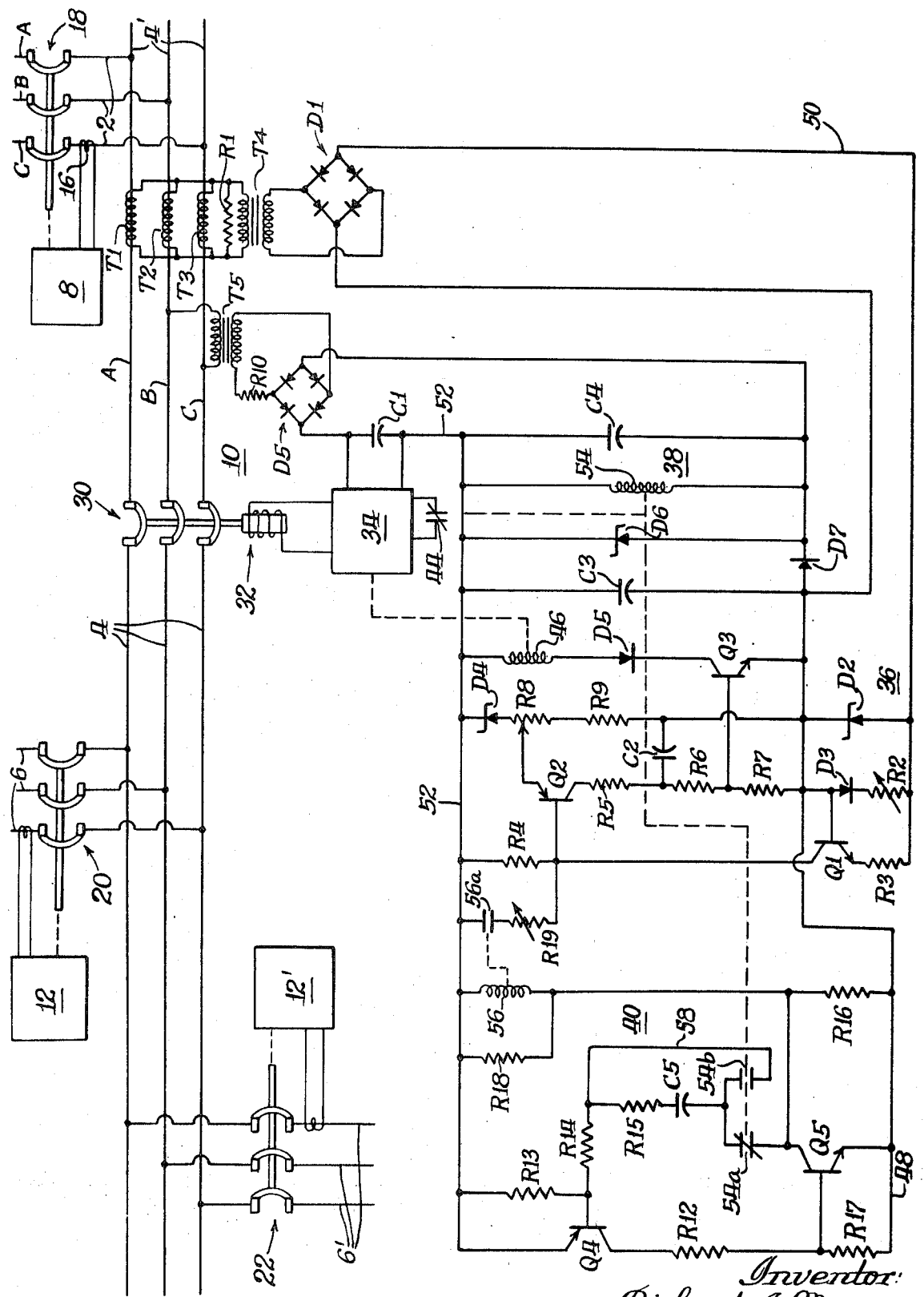

OVERCURRENT SENSING AND RESTRAINT CONTROL FOR SECTIONALIZING SWITCH

BACKGROUND OF THE INVENTION

This invention relates to a control circuit for protection devices and more particularly to a control circuit for an automatic sectionalizing switch.

It is common practice in distribution systems to coordinate a repeating circuit interrupter connected in series with the main distribution line and located adjacent to the source of power, and sectionalizing switches disposed in feeder lines radiating from the main line. Because the majority of faults in such systems are temporary in nature and will clear in a relatively short time, the repeating circuit interrupter is adjusted to execute a series of successive opening and reclosing operations during which time the sectionalizing switch contacts remain closed. If the fault has not cleared after a predetermined number of such opening and reclosing operations, usually three, it is considered permanent in which case it should be isolated from the source.

If the fault is on the load side of a sectionalizing switch in a feeder line, the sectionalizing switch in that line will open subsequent to the third opening operation of the circuit breaker thereby isolating the fault from the main line. For this purpose, sectionalizing switches are provided with fault integrating means which count the number of fault current impulses and then operate switch opening means to isolate the faulted feeder line from the main line while the current to the remaining feeder lines remains closed. The opening of the sectionalizing switch contacts takes place while the repeating circuit breaker is open, so that the sectionalizing switch is not required to have fault interrupting capacity. After the sectionalizing switch in the faulted section has opened, the repeating circuit breaker again recloses to restore service to the non-faulted feeder lines. If, on the other hand, the permanent fault exists on the source side of a sectionalizing switch, the sectionalizing switch will remain inactive while the repeating circuit breaker cycles to lockout. Thus, when service is restored in the main line the feeder line will be immediately energized. Where the sectionalizing switch control includes an overcurrent sensing means, a problem arises in that the overcurrent sensing means will cause operation of the switch counting means in response to any high current having a value equal to or greater than a predetermined fault current value. This is particularly true where the overcurrent sensing means is or includes a ground overcurrent sensing means since ground fault currents are usually of a low level and means for sensing these currents must be particularly sensitive. For example, if a fault occurs in part of the system other than the feeder line in which the sectionalizing switch is located, the circuit breaker will de-energize the system. Upon reclosing of the breaker and re-energization of the system, the inrush current into the feeder line through the sectionalizing switch may be sufficient to cause the ground overcurrent sensing means to actuate the counting means upon reopening of the breaker due to the fault continuing elsewhere in the system. As a result, coordination between the repeating circuit breaker and the sectionalizing switch is lost and the sectionalizing switch will not operate at the proper time in the event of a closely following fault in the feeder line.

Sectionalizing switch controls are also frequently provided with restraint means which prevent operation of the switch counting means when voltage or current is present at the sectionalizing switch. The presence of voltage at a sectionalizing switch indicates that the reclosing circuit closest to the source from the circuit breaker is closed. By providing the restraint means, the sectionalizing switch is prevented from opening so that the branch line repeating circuit breaker can cycle and open the branch line to thereby remove the fault and permit the sectionalizing switch to feed other non-faulted branch lines. One type of voltage sensing means in which the sensing of loss of voltage is utilized to actuate an inrush current restraint is disclosed in U.S. Pat. No. 3,571,661 issued on Mar. 23, 1971 and assigned to the assignee of the present application. This patent is directed to a phase current inrush restraint control and discloses relatively complex circuitry for accomplishing such function.

SUMMARY OF THE INVENTION

It is a general object of the invention to provide a sectionalizing switch control having a relatively simple and economical overcurrent sensing circuit and an inrush current restraint circuit which obtains operating power from system voltage or current and in which the inrush current restraint circuit is operative in response to the sensing of one of the system voltage or current quantities at the sectionalizing switch.

The objects of the invention are accomplished by providing a sectionalizing switch control with an overcurrent sensing circuit and an inrush current restraint circuit actuated by means for sensing the presence of voltage at the sectionalizing switch. If a fault occurs which is not in the feeder line in which the sectionalizing switch is located, voltage will continue to be present at the sectionalizing switch if a branch line repeating circuit breaker opens or will be present upon reclosing of the main repeating circuit breaker. When this voltage is present at the sectionalizing switch following reclosing of the main circuit breaker, the voltage sensing means will actuate the inrush current restraint means so that the ground fault overcurrent sensing means will not operate to produce a signal to the sectionalizing switch counting means due to load inrush current. The restraint means will operate for a length of time determined by the time required for the inrush load current to subside. If the fault is a ground fault in the feeder line in which the sectionalizing switch is located and is not remote from the sectionalizing switch, the voltage sensing means will also sense voltage at the sectionalizing switch when the main repeating circuit breaker recloses. However, the greater current available due to a fault causes the overcurrent sensing means to operate in spite of the restraint means and produce an output signal to the sectionalizing switch counting means. If the ground fault continues during a predetermined number of opening operations by the main repeating circuit breaker, the ground fault overcurrent sensing means will produce a sufficient number of signals to the counting means for the latter to actuate the sectionalizing switch opening means to thereby cause opening of the switch contacts and isolation of the feeder line. Since the energy available from a ground fault overcurrent is relatively low compared to the energy available from the system voltage or current at the sectionalizing switch during the fault, power for operating the sectionalizing switch control is obtained from system voltage or current.

Other objects and advantages of the invention will in part be obvious and will in part appear hereinafter. For a fuller understanding of the nature and objects of the invention, reference should be made to the following detailed description taken in connection with the accompanying drawing which schematically illustrates a sectionalizing switch control including an overcurrent sensing circuit and an inrush current restraint circuit according to the instant invention.

DESCRIPTION OF THE PREFERRED EMBODIMENT

Referring generally to the drawing, an electrical distribution system is illustrated as being connected to a three-phase source of power denoted by the symbols ABC and as having a main line section 2 in series with the source of power. The individual symbols A, B, or C also identify each separate phase line. A plurality of feeder lines 4 and 4' radiate from the main line 2 and a plurality of branch lines 6 and 6' radiate from the feeder line 4. The system also includes a main circuit breaker 8 of the repeating type disposed in the main line 2 adjacent to the source of power ABC and a sectionalizing switch 10 disposed in feeder line 4 adjacent its junction with the main distribution line 2. Another sectionalizing switch (not shown) identical in construction and operation to switch 10 is located in the feeder line 4' adjacent its junction with the main distribution line 2. Since the second sectionalizing switch is identical in operation and construction to the sectionalizing switch 10 it will not be further discussed herein. The branch lines 6 and 6' respectively have repeating circuit breakers 12 and 12' similar in operation to the main repeating circuit breaker 8 connected adjacent their junctions with the feeder line 4.

Upon the occurrence of a fault in the main line 2 or in one of the feeder lines 4 or 4', the repeating circuit breaker 8 senses the fault through the current transformer 16. After an opening time delay, the main switch 18 of circuit breaker 8 opens. After a closing time delay, the repeating circuit breaker 8 will close its main switch 18. If the fault has cleared during the opening and reclosing cycle, the main switch 18 will remain closed. If, however, the fault does not clear during this interval, there follows a predetermined number of successive opening and closing operations followed by the locking open of the main switch 18. The circuit breakers 12 and 12' operate similarly upon the occurrence of a fault in their associated branch lines 6 and 6'. The details of the automatic repeating circuit breakers just discussed are well known in the art and form no part of the instant invention. Accordingly, the circuit breakers 8, 12 and 12' have been schematically illustrated and described only in general terms.

It will be appreciated that if a fault current appears in the main line 2, the feeder line 4, or either of the branch lines 6 or 6', fault current will flow from the source ABC to the point of the fault. The repeating circuit breakers are so adjusted that the opening time delay of breaker 8 will be longer than that of breakers 12 and 12'. Should a fault occur in the branch line 6', therefore, it will be sensed by both main circuit breakers 8 and branch line circuit breaker 12'. However, because the opening time of repeating circuit breaker 12' is shorter than that of repeating circuit breaker 8, breaker 12' will operate to isolate the fault and therefore interrupt the flow of fault current through the current transformer 16 of circuit breaker 8. As a result, the circuit breaker 8 will not operate when there is a fault in either of the branch lines 6 and 6' or similar branch lines connected to feeder line 4'. On the other hand, should the fault occur in the main line 2 or either of the feeder lines 4 or 4', it will not be sensed by either of the circuit breakers 12 and 12' and, as a result, it will cause the operation only of circuit breaker 8. It can thus be seen that faults in the main line 2 and in the feeder lines 4 and 4' will cause the operation of the circuit breaker 8 while faults in either of the branch lines 6 and 6' will actuate the corresponding repeating circuit breakers 12 and 12'.

It will be appreciated, too, that if the repeating circuit breaker 8 were permitted to cycle to lockout upon the occurrence of a fault in the feeder line 4, for example, the permanent opening of its contacts would also interrupt the non-faulted feeder line 4' and the branch lines connected to feeder line 4'. For this reason, a sectionalizing switch 10 in feeder line 4 and an identical sectionalizing switch in feeder line 4' are provided. Sectionalizing switch 10 will open feeder line 4 upon the appearance of a permanent fault in feeder line 4 and thereby allow the circuit breaker 8 to reclose and continue service to the non-faulted feeder line 4'. The aforementioned identical sectionalizing switch in feeder line 4' operates similarly with respect to feeder line 4'.

The sectionalizing switch 10 is of a type well known in the art and, except for the portion of sectionalizing switch 10 that cooperates with the present invention, it will not be described in detail herein. For a detailed description of sectionalizing switch 10, reference is made to U.S. Pat. No. 3,418,529, issued to O. G. Attewell on Dec. 24, 1968. The sectionalizing switch 10 as shown in the drawing comprises switch means 30, switch opening means 32, signal and actuating means 34, overcurrent sensing means 36, voltage sensing means 38 and inrush current restraint means 40. The signal and actuating means 34 includes an energy storage capacitor C1, a voltage restraint means 44 and signal counting coil 46. The capacitor C1 provides operating power for the signal and actuating means 34. The coil 46 initiates a counting operation by the signal and actuating means 34 and the voltage restraint contacts 44 prevent such a signal counting operation in the event that voltage is present at the sectionalizing switch 10 while a signal counting operation is attempted. Upon overcurrent caused by a fault on the load side of the sectionalizing switch 10, the overcurrent sensing means 36 produces an output signal to the signal counting coil 46. Also, since voltage is not present at the sectionalizing switch 10 when the recloser opens, the voltage restraint contacts 44 open. Upon receipt of the output signal to the coil 46, the signal and actuating means 34 is operative to transfer a portion of the charge on capacitor C1 to another capacitor (not shown) comprising part of the signal and actuating means 34. Since a fault overcurrent also causes operation of reclosing circuit breaker 8, the main switch 18 opens to interrupt the current in the main distribution line 2 and the feeder lines 4 and 4'. As described in detail in aforementioned U.S. Pat. No. 3,418,529, upon opening of the main switch 18 in the main line 2 of the system, the counting operation of the sectionalizing switch in the feeder line is completed. As previously described, the main repeating circuit breaker 8 will remain open for a predetermined time delay and then reclose. If the overcurrent continues on the load side of sectionalizing switch 10, the circuit breaker 8 opens again and another counting operation is performed. After a predetermined number of signals are produced to coil 46 and a corresponding number of counting operations are performed, the switch opening means 32 is energized to open the switch means 30. Inasmuch as the contacts of switch means 30 are not designed to have an interrupting rating of fault current magnitude, the timing of the signal and actuating means 34 is such that the switch means 30 is opened while the main switch 18 of circuit breaker 8 is open. The opening of the switch means 30 isolates the fault in the feeder line 4 so that upon the subsequent closing of the main switch 18, current conditions in the system will have returned to normal. Thus, main switch 18 will not reopen and continued service will be resumed in the main line 2 and the other feeder line 4'.

As shown in the drawing, the overcurrent sensing means 36 includes current transformers T1, T2, and T3 connected in parallel and respectively coupled to phase lines A, B, and C. A shunting resistor R1 is connected across current transformers T1, T2, and T3 in the event that their secondary windings are open circuited. The current transformers T1, T2, and T3 are also connected across the primary of a potential transformer T4 having a rectifying bridge D1 connected to its secondary winding. The capacitor C3, diode D7, and zener diode D6 form a stabilized power supply for the current sensing means 36 with diode D6 controlling the maximum charge on capacitor C3.

The output terminals of the rectifying bridge D1 are connected in shunt with a voltage limiting zener diode D2 and with a series connected diode D3 and resistor R2. Resistor R2 develops a voltage drop proportional to the unbalanced line current in current transformers T1, T2 and T3. The base-emitter diode in transistor Q1 and a resistor R3 are also connected in series across the output terminals of rectifying bridge D1. A resistor R4 is connected to the collector of transistor Q1. The voltage drop on resistor R3 is virtually identical to that on resistor R2 and, because of the common base connection of transistor Q1, the voltage drop across resistor R4 is proportional to the voltage drop on resistor R3.

An output circuit portion of current sensing means 36 includes transistor Q2 having its base connected to resistor R4 and its collector connected through resistors R5, R6, and R7 to conductor 48 and to one side of capacitor C2 through resistor R5. The other side of capacitor C2 is also connected to conductor 48. The emitter of transistor Q2 is connected to a variable resistor R8 which in turn is connected in series with zener diode D4 and resistor R9 between conductors 48 and 52. The resistor R8 permits adjustment to control the forward biasing signal required at the base of transistor Q2 to render it conductive. The zener diode D4 prevents change in the level of the forward biasing signal required to render transistor Q2 conductive as a result of temperature change. In this respect, the zener voltage of diode D4 increases with a temperature increase in approximately the same amount as the voltage drop of the emitter-base diode within transistor Q2 decreases with increasing temperature. The base of output transistor Q3 is connected to the junction between resistors R6 and R7 and the collector-emitter circuit of transistor Q3 is connected in series with signal counting coil 46 and a diode D5. Because a rectifying bridge D1 produces a relatively rough output direct current wave form, transistor Q1 turns on and off as the signal to the base of transistor Q1 varies. To maintain transistor Q3 constantly on and thereby produce a steady output signal to coil 46, the charging circuit of resistor R5 and capacitor C2 is provided. When transistor Q2 initially becomes conductive, the conduction of transistor Q3 will be delayed until capacitor C2 is at least partially charged. Thereafter, when transistor Q2 becomes non-conductive, capacitor C2 will discharge through resistor R6 to the base of transistor Q3 to maintain the latter conductive.

The voltage sensing means 38 includes potential transformer T5 and a rectifying bridge D5. The energy storage capacitor C1 is charged through resistor R10 from transformer T5. The voltage sensing means 38 also includes voltage sensing coil 54, capacitor C4 and diode D7. The capacitor C4 maintains the coil 54 steadily energized between rectified full wave portions from transformer T5. The diode D7 prevents the power supply capacitor C3 from discharging through coil 54 and affecting its operation. The voltage sensing coil 54 operates contacts 54a and 54b and also contacts 44 as shown by the dashed lines in the drawing. The contacts 54a, 54b and 44 are shown in the drawing in their conditions during normal current and voltage conditions on the feeder line 4. Thus, voltage is sensed by the coil 54 and contacts 44 are closed to prevent a counting or switch opening operation by the signal and actuating means 34. The position and operation of the contacts 54a and 54b will be discussed hereinafter in conjunction with a detailed discussion of the current sensing restraint means 40.

The inrush current restraint means 40 includes a static switch circuit having a transistor Q4, a transistor Q5, resistors R13, R14 and R15 and capacitor C5. The transistor Q4 has its collector connected to the base of the transistor Q5 through a current limiting resistor R12. The base of transistor Q4 is connected to the junction between resistors R13 and R14. The resistors R13, R14 and R15 and capacitor C5 are connected in series through normally closed contacts 54a and resistor R16 between conductors 52 and 48. Resistor R15 and capacitor C5 are also shunted by normally open contacts 54b during normal current and voltage conditions of feeder line 4. The collector of transistor Q5 is connected between contacts 54a and resistor R16 and the base of transistor Q5 is connected through resistor R17 to conductor 48. A coil 56 is connected between conductor 52 and the junction between the collector of transistor Q5 and resistor R16. A resistor R18 is connected in shunt with the coil 56. A signal level modifying resistor R19 is connected in parallel with resistor R4 through normally open contacts 56a.

When the coil 56 is energized, the contacts 56a are closed to effectively place resistor R19 in parallel with resistor R4. The level of the input signal to the base of transistor Q2 will be changed when resistors R19 and R4 are effectively connected in parallel since the voltage drop from conductor 52 to the base of transistor Q2 is developed through these resistors. When the circuit breaker 8 recloses following an opening operation due to a fault current, the voltage sensing coil 54 will switch the contacts 54a and 54b from positions opposite that shown in the drawing to the positions shown in the drawing. This will complete a circuit between conductors 52 and 48 through resistors R13, R14, R15, capacitor C5 and resistor R16 which will permit the flow of current to charge capacitor C5. This current flow through resistor R13 will forward bias transistor Q4 so that it conducts current to conductor 48 to thereby forward bias transistor Q5. Resistor R16 is of a size which limits current to a value below that necessary to allow coil 56 to operate contacts 56a, however, conduction by transistor Q5 results in sufficient current flow through coil 56 to cause it to operate and close contacts 56a. This changes the signal level to the base of transistor Q2, as previously described. Transistor Q4 remains conductive only as long as current flows to charge capacitor C5 and when capacitor C5 is charged, there will be insufficient current flow through resistor R13 to maintain transistor Q4 conductive. When transistor Q4 ceases to conduct, transistor Q5 also is rendered non-conductive and coil 56 opens contacts 56a. This terminates the time period during which the signal level to the base of transistor Q2 is modified so that the current sensing means 36 will subsequently sense and produce an output signal in response to whatever level of overcurrent it has been adjusted to sense with only resistor R4 effectively connected to transistor Q2. The time during which the contacts 56a are closed and the input signal level is modified is determined by the time required to charge capacitor C5 through the resistors in series with it to the point where transistor Q4 no longer conducts. When voltage sensing coil 38 does not sense voltage due to the opening of circuit breaker 8, the contacts 54a and 54b will be switched to their positions opposite from that shown in the drawing and capacitor C5 will discharge through resistor R15 and the shunt path provided by conductor 58.

In summary, during normal current and voltage conditions on the feeder line 4, the potential transformer T5 and rectifying bridge D5 will maintain the energy storage capacitor C1 and the power supply capacitor C3 fully charged. The voltage sensing coil 54 will be energized and maintained steadily in such condition by capacitor C4. While energized, coil 54 holds voltage restraint contacts 44 closed so that signal and actuating means 34 cannot operate. The current transformers T1, T2 and T3 sense ground current in feeder line 4, however, this current is not sufficient to cause conduction of transistors Q2 and Q3. Also, during normal current and voltage conditions on feeder line 4, the transistors Q4 and Q5 are in a non-conductive condition. If a ground fault overcurrent occurs in feeder line 4, the current from transformers T1, T2 and T3 to transistor Q1 will increase and the level of conduction of transistor Q1 will therefore, also increase. The corresponding increased signal level to transistor Q2 will cause its conduction and consequently conduction of transistor Q3 to provide an output signal to coil 46 and the initiation of a counting operation by signal and actuating means 34. The overcurrent condition in the feeder line 4 is also sensed by the circuit breaker 8 and after a time delay it opens so that the overcurrent sensing means 36 no longer detects the overcurrent condition and voltage sensing coil 54 is de-energized to open contacts 44 and 54a. During the time that the breaker 8 is open, the counting operation by the means 34 is completed. When the circuit breaker 8 recloses, the voltage sensing coil 54 will be energized to close contacts 44 and 54a. This results in transistors Q4 and Q5 assuming a switched condition and becoming conductive and in resistor R19 being connected in parallel with resistor R4 for a predetermined time period. However, if a ground fault overcurrent condition continues to exist, the voltage developed across resistors R4 and R19 will cause conduction of transistor Q2 and another subsequent counting operation by means 34. If the ground fault condition continues during a predetermined number of counting operations by the signal and actuating means 34, it will actuate the switch opening means 32 and the switch 30 will be opened while the circuit breaker 8 is open to thereby isolate the feeder line 4 from the rest of the system before reclosing of circuit breaker 8.

In the event that the ground fault overcurrent occurs in the branch line 6', a current unbalance will be sensed by current transformers T1, T2 and T3 and the transistor Q1 will be rendered sufficiently conductive to initiate a counting operation by the means 34. After its opening time delay, the circuit breaker 12' will open the switch 22 to remove the fault from the feeder line 4. However, the voltage sensing coil 54 will continue to sense voltage at the sectionalizing switch 10 so that contacts 44 and 54a remain closed. As previously stated, the contacts 44 in their closed position prevent completion of the counting operation by means 34. This mode of operation of the sectionalizing switch 10 will continue while the fault overcurrent remains on branch line 6' until the repeating circuit breaker 12' cycles to its lockout position and the fault on branch line 6' is isolated from the rest of the system.

In the event that the ground fault overcurrent is on the feeder line 4', the main repeating circuit breaker will open the main switch 18 after a time delay to de-energize the system. When the main switch 18 is again closed, there will be a high level of load current inrush to the feeder line 4. This current inrush may appear as a fault current to the sectionalizing switch 10 which will be sensed by the transformers T1, T2, and T3, and which will result in transistor Q1 being rendered sufficiently conductive to turn on transistors Q2 and Q3. However, since the fault condition is in feeder line 4' the voltage sensing coil 54 will sense voltage at the sectionalizing switch 10 and will close contacts 54a upon re-energization of the feeder line 4. Therefore, resistor R19 will be connected in parallel with resistor R4 and the level of the input signal to transistor Q2 due to conduction by transistor Q1 will not be sufficient to render transistor Q2 conductive. Thus an output signal will not be produced to the means 34 and a counting and actuating operation will not take place. Each time the main circuit breaker 8 opens and recloses, a counting and actuating operation by means 34 will be prevented in a similar fashion.

While only a single embodiment of the invention has been shown herein, it will be realized that many modifications thereof are feasible without departing from the spirit and scope of the invention. For example, the sensing means could be a current sensing means rather than a voltage sensing means and the inrush current restraint means would be operated as a result of the presence of current following closing of the main reclosing circuit breaker. It is accordingly intended that the scope of the invention is not to be limited by the specific embodiment disclosed.

I claim:

1. In a protective device coupled to an electrical system and including switch means, switch opening means, and actuating circuit means for counting a series of signals and actuating said opening means after a predetermined number of signals occur, the combination comprising:
   current sensing means coupled to said system and being responsive to an overcurrent in said system to produce one of said signals to the actuating circuit means;
   restraint means for preventing operation of the current sensing means when said overcurrent is below a predetermined level; and
   voltage sensing means responsive to the presence of voltage in said system for actuating said restraint means.

2. The combination according to claim 1 further comprising another restraint means responsive to said voltage sensing means for preventing operation of the actuating means when voltage is present in the system at said switch means.

3. The combination according to claim 2 wherein said current sensing means is responsive only to ground overcurrent in said system.

4. The combination according to claim 3 wherein said protective device comprises a sectionalizing switch.

5. In a sectionalizing switch coupled to an electrical system and including a main switch, switch opening means, signal means for producing an electrical signal and actuating means for counting a series of said signals and actuating said opening means after a predetermined number of signals occur, the combination comprising:
   current sensing means coupled to said system and generating an input signal proportional to the level of current in said system, said sensing means including switch means responsive to a predetermined level of said input signal proportional to a predetermined overcurrent in said system to actuate said signal means;
   restraint means for changing the level of said input signal to prevent actuation of the signal means by the switch means in response to said predetermined overcurrent in said system; and
   voltage sensing means coupled to said system and said restraint means, and responsive to the presence of voltage in said system for actuating said restraint means.

6. In a sectionalizing switch coupled to an electrical system and including a main switch, switch opening means, signal means for producing an electrical signal and actuating means for counting a series of said signals and actuating said opening means after a predetermined number of signals occur, the combination comprising:
   current sensing means coupled to said system and generating an input signal proportional to the level of current in said system, said sensing means including switch means responsive to a predetermined level of said input signal to actuate said signal means, said switch means comprises a static switching circuit having a predetermined conductive bias signal level and said input signal comprises the bias signal of said static switch circuit;
   restraint means for changing the level of said input signal to prevent actuation of the signal means by the switch means, and
   voltage sensing means coupled to said system and said restraint means for actuating said restraint means.

7. The combination according to claim 6 wherein said static switching circuit includes:
   a static switch having an input electrode and a biasing electrode receiving said bias signal, said electrodes being a conductive series circuit when said static switch is conductive, said series circuit having a voltage drop in a predetermined direction in response to an increase in temperature; and
   a static device connected in series with the series circuit of the static switch and having a voltage drop approximately equal to but in a direction opposite from said predetermined direction in response to an increase in temperature whereby said predetermined conductive bias signal level remains substantially constant.

8. The combination according to claim 5 wherein said restraint means includes timing means and is operative for a period of time determined by said timing means and beginning substantially simultaneously with the presence of voltage in said system at the sectionalizing switch.

9. In a sectionalizing switch coupled to an electrical system and including a main switch, switch opening means, signal means for producing an electrical signal and actuating means for counting a series of said signals and actuating said opening means after a predetermined number of signals occur, the combination comprising:
   current sensing means coupled to said system and generating an input signal proportional to the level of current in said system, said sensing means including switch means responsive to a predetermined level of said input signal to actuate said signal means;
   restraint means for changing the level of said input signal to prevent actuation of the signal means by the switch means, said restraint means includes timing means and is operative for a period of time determined by said timing means and beginning substantially simultaneously with the presence of voltage in said system at the sectionalizing switch; and
   voltage sensing means coupled to said system and said restraint means for actuating said restraint means, including said timing means in response to the initial presence of voltage in said system at said sectionalizing switch.

10. The combination according to claim 9 wherein:
    said current sensing means is responsive only to ground current in said system;
    said sectionalizing switch includes a voltage transformer coupled to said system and supplying energy to said current sensing means and restraint means; and
    said actuating means includes energy storage means for providing switch opening power to the switch opening means, said energy storage means being coupled to said voltage transformer and receiving energy from said transformer.

11. The combination according to claim 10 further comprising another restraint means connected to said voltage transformer for preventing operation of the actuating means when voltage is present in the system at said switch means.

12. In a sectionalizing switch coupled to an electrical system producing alternating voltage and current quantities and including switch means, switch opening means, and actuating circuit means for counting a series of signals and actuating said opening means after a predetermined number of signals occur, the combination comprising:

current sensing means coupled to said system and being responsive to an overcurrent in said system to produce one of said signals to the actuating circuit means;

restraint circuit means including timing means for providing a timing period and being coupled to the current sensing means for preventing operation of the current sensing means when said overcurrent is below a predetermined value, said restraint circuit means being initially operative in response to the presence of one of said voltage and current quantities and continuing operative during said timing period; and sensing means responsive to the presence of one of said alternating current and voltage quantities for actuating said restraint means.

13. The combination according to claim 12 wherein said restraint circuit means has a normal condition and also has a switched condition when operative.

14. The combination according to claim 12 wherein said restraint circuit means includes static switch means having a first condition and a second condition for maintaining the restraint circuit means operative while in said second condition, said static switch means being in said second condition only during said timing period.

15. The combination according to claim 14 wherein said first condition is the conductive condition of the static switch means during normal operating conditions of the electrical system and said second condition is a conductive condition opposite that of the first condition.

* * * * *